United States Patent [19]
Abell et al.

[11] 3,834,252
[45] Sept. 10, 1974

[54] ADJUSTABLE POSITIVE CLUTCH SCREWDRIVER

[75] Inventors: William David Abell, Manchester; William Frank Sindelar, Towson, both of Md.

[73] Assignee: The Black and Decker Manufacturing Company, Towson, Md.

[22] Filed: June 11, 1973

[21] Appl. No.: 369,057

[52] U.S. Cl.............. 81/52.4 R, 192/56 R, 192/108
[51] Int. Cl......................................................... B25b
[58] Field of Search........... 81/52.4 R, 52.4 A, 58.3; 64/27 CS, 29; 192/70.28, 56 R, 150, 108

[56] References Cited
UNITED STATES PATENTS
2,728,252  12/1955  Connell............................ 81/52.4 R
3,442,360  5/1969  Fulop..................................... 64/29
3,613,751  10/1971  Juhasz.............................. 192/56 R

*Primary Examiner*—James L. Jones, Jr.
*Attorney, Agent, or Firm*—Edward D. Murphy; Leonard Bloom; Joseph R. Slotnik

[57] ABSTRACT

A portable, power-operated tool such as a power screwdriver which includes a housing having a motor, a gear transmission and an output shaft. An output rotary tool member is adapted to be connected to the output shaft by a positive clutch when the tool is applied to a workpiece. A novel arrangement whereby the maximum torque transmitted through the positive clutch can be limited is disclosed.

23 Claims, 9 Drawing Figures

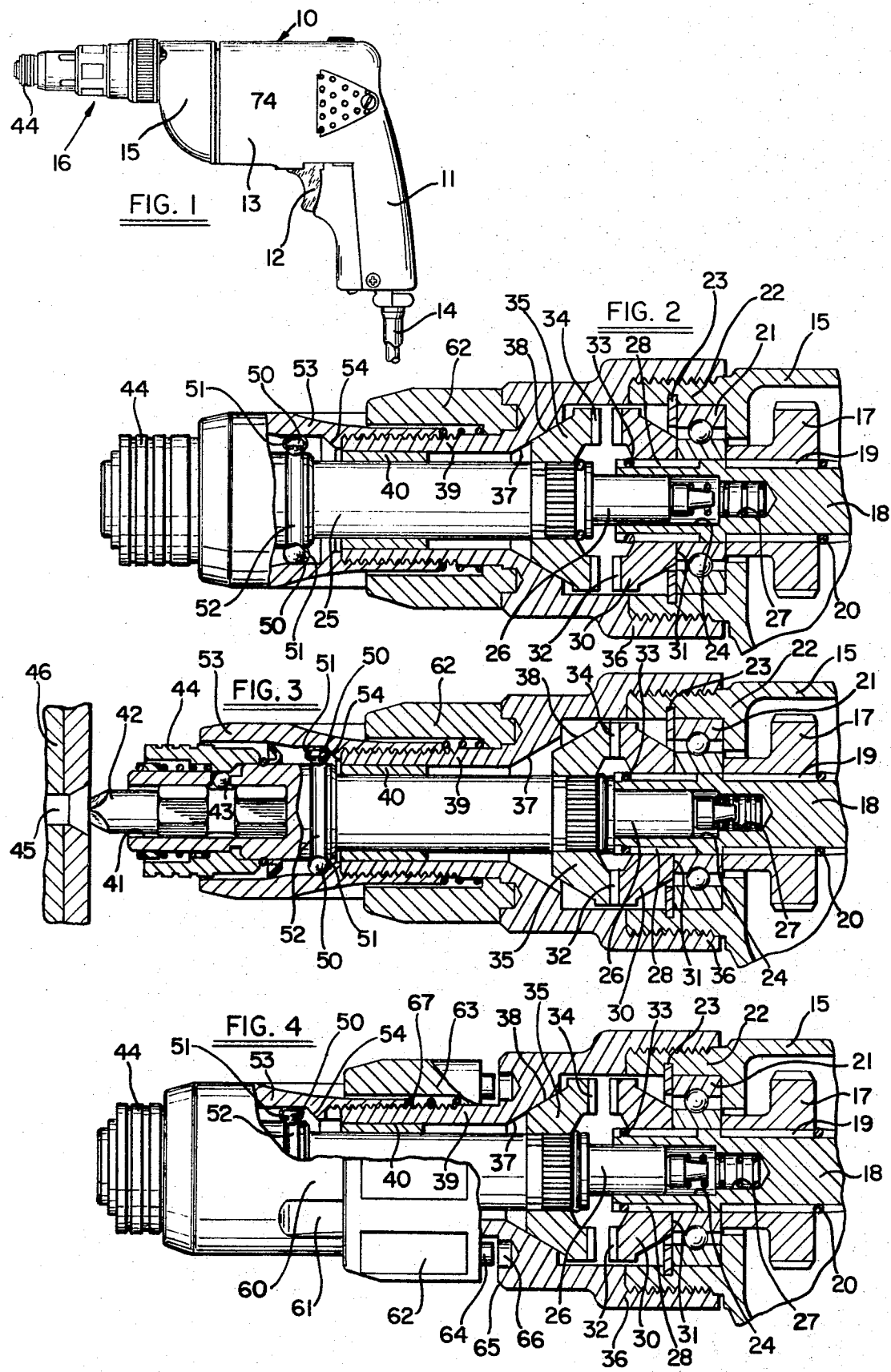

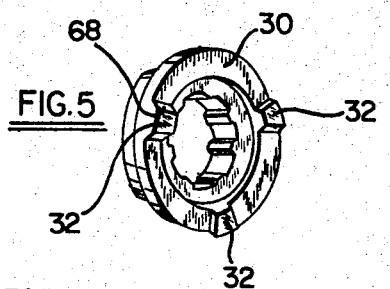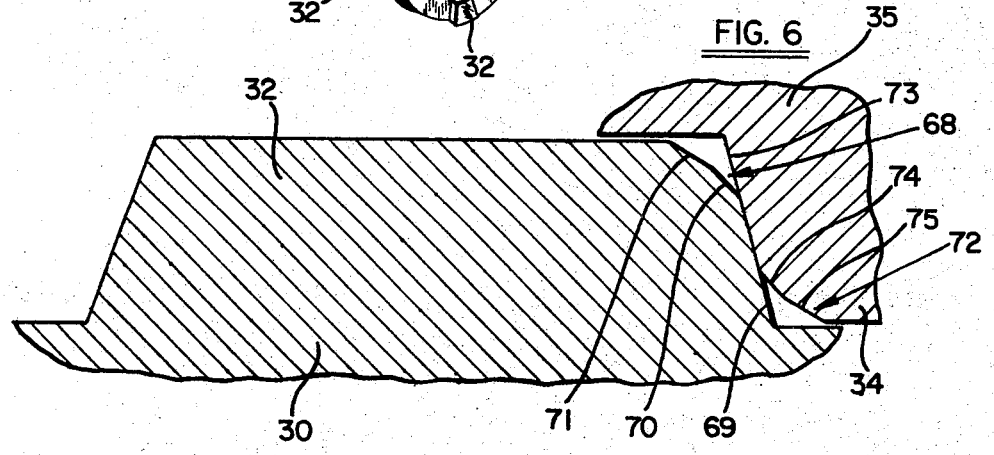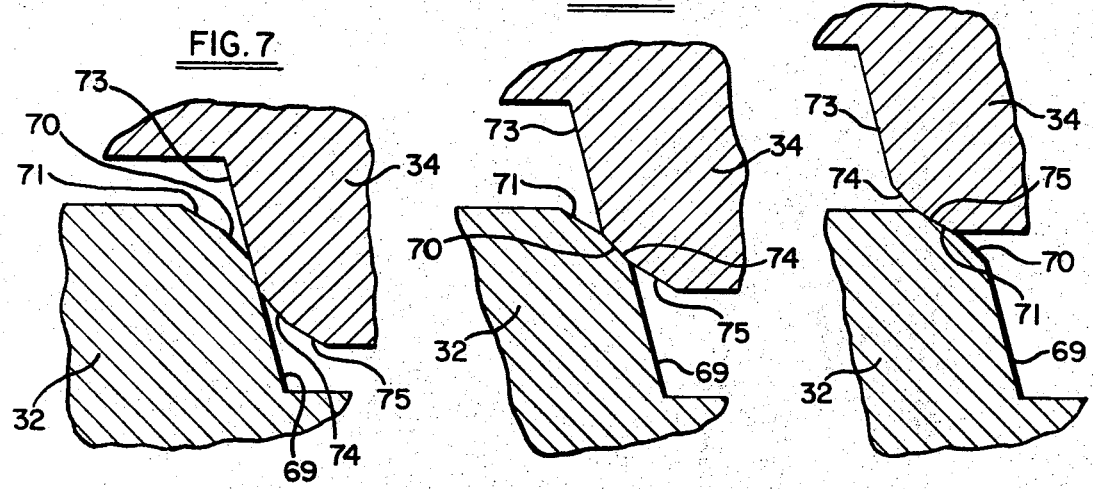

ADJUSTABLE POSITIVE CLUTCH SCREWDRIVER

SUMMARY OF THE INVENTION

The present invention is broadly directed to a novel power-operated screwdriver including an improved clutch and is specifically directed to a unique torque-limiting adjustment means for the clutch.

Previous clutch mechanisms for air-or electric-operated portable screwdrivers have commonly been one of two general types; positive clutches or adjustable clutches. The positive clutch includes two sets of clutch teeth spring biased apart so that the operator must apply a bias force to overcome the spring and hold the teeth in engagement. The teeth are angled so that when the axial component of screw torque overcomes the applied operator pressure, the clutch disengages. In general, such clutches have not been adjustable by the user; the manufacturer provides a series of tools, each of which is specifically designed for a predetermined torque range. Also, due to the possible variation in operator bias force, the torque control achieved with these tools has not been accurate.

Adjustable clutch mechanisms usually include a ratcheting clutch which is spring loaded into engagement by an adjustable spring force. When the torque exerted on the screw exceeds the spring force, the ratcheting clutch begins to slip. However, these tools also require additional length, weight and expense, since a positive clutch is also required for dead spindle operation.

Both of these types of clutches are limited in their potential uses by various specific aspects of these clutches. For example, as previously noted, the positive clutch must usually be designed for a particular range of screw sizes; in addition, since torque control is basically obtained from the operator bias, it is very difficult to produce uniform, accurately torqued screws when a high RPM is desired for fast rundown, as in production work. On the other hand, the adjustable clutches are more complex and larger than is desirable. In addition, in the event that the material to which the screw is being applied changes, such as due to a knot in wood, an adjustable clutch cannot be over-ridden by operator bias. It must either be readjusted to a new setting or a hand screwdriver must be used, either of which is highly undesirable on a production line.

It is the purpose of the present invention to provide a novel clutch for power-operated portable screwdrivers which overcomes these difficulties and which enables a tool to be provided which is universally adjustable to properly torque a wide variety of screw sizes and joint types.

It is accordingly an object of the present invention to provide a new and improved adjustable clutch for portable poweroperated tools such as screwdrivers.

A further object of this invention is the provision of an improved, unique, positive clutch mechanism for power tools which is adjustable to accommodate a variety of screw sizes.

Another principle object of this invention is the provision of a power screwdriver having an adjustable clutch which can be operated at high speed without loss of control and which can be at least partially over-ridden by the operator in the event of unusual workpiece variation.

Further objects and advantages of the present invention will become more apparent from the consideration of the detailed description which follows when taken in conjunction with the drawing attached.

BRIEF DESCRIPTION OF THE DRAWINGS

FIG. 1 is a vertical plan view illustrating a power tool incorporating a clutch in accord with the present invention;

FIGS. 2, 3, and 4 are vertical cross-sectional views taken through the output portion of the tool of FIG. 1 and showing the clutch of this invention in various operational positions;

FIG. 5 is a perspective view of one of the clutch elements of FIG. 2; and

FIGS. 6, 7, 8 and 9 are expanded views showing the clutch teeth of this invention schematically in alternative operational positions.

BROAD STATEMENT OF THE INVENTION

Briefly, in accord with the preferred embodiment of this invention, a portable, power-driven screwdriver is provided which includes a housing, motor and transmission means within the housing, rotary output shaft means coupled to the motor through the transmission, rotary tool means supported by the housing, and clutch means for coupling the rotary tool means to the rotary shaft means for torque transmission when an operator bias is applied to the clutch. The clutch specifically includes axially opposed members including teeth which are spring biased apart. When operator bias is applied to a workpiece through the tool, the spring force is overcome and the clutch members are brought into engagement. One member is coupled to the rotary shaft while the other is coupled to the rotary tool means, thus transmitting torque from the shaft to the tool and into an output means such as a bit, nutsetter, etc. which may be provided therein. In further accord with this invention, adjustable means are provided for controlling the maximum permitted depth of engagment of the clutch members to control the maximum permitted torque which can be transmitted through the clutch. In accord with a specific optical arrangement of this invention, the clutch members include axially extending teeth, the pressure angle of which changes with axial depth of engagement so as to provide more precise control over the torque output level.

FIG. 1 illustrates a portable, power-operated tool embodying the present invention. Specifically, an electric screwdriver 10 including a piston grip handle 11, trigger switch 12 and motor housing 13 is shown. Electric power is supplied to a motor (not shown) within the housing 13 via a power cord 14 under the control of the switch 12. The rotary output of the motor is applied through a transmission contained within the gear housing 15 to an output mechanism indicated generally at 16. It is to be understood that the reference to an electric screwdriver is for purposes of illustration only and that this invention is applicable to any power driven tool which utilizes a clutch with variable torque-transmission capability.

FIG. 2 is a cross-sectional view through the output mechanism 16. As can be seen therein, the forward portion of the gear case 15 encloses a spur gear 17 which is mounted on a shaft 18 by means of splines 19 so that the torque generated by the tool motor is transmitted to the shaft. A suitable snap ring 20 retains the gear 17 on the shaft. The shaft 18 is supported by a rear bearing, not shown, in the gear case 15 and also by a forward bearing 21 which is mounted in a forwardly extending portion 22 of the gear case 15. The bearing is retained by a snap ring 23. The shaft 18 includes a bore 24 which extends rearwardly from its forward end. An output shaft 25 is provided including an extension 26 which is slidably mounted within the bore 24. The output shaft 25 is biased forwardly (to the left in FIGS. 1 and 2) by a spring 27.

Splines 28 on the shaft 18, forwardly of the bearing 21, receive a clutch member 30. The clutch member includes a rearwardly facing surface 31 which abuts the inner race of bearing 21 and a forwardly facing set of teeth 32. The clutch member 30 is retained on the shaft 18 by a suitable snap ring 33. The clutch teeth 32 are arranged to be engaged with corresponding teeth 34 on a mating clutch member 35 which is fixedly mounted on the output shaft 25.

The output shaft and forward clutch member 35 are supported by a housing collar 36 which is threaded to the forward portion 22 of the gear case 15. A sloping surface 37 on the interior of the housing collar is matched with a corrresponding surface 38 on the clutch member 35 so that the housing collar limits the forward movement of the clutch member and output shaft under the influence of the spring 27. The housing collar includes a forwardly extending cylindrical portion 39 and a sleeve bearing 40 is provided for supporting the forward portion of the output shaft 25. As can best be seen in FIG. 3, the forward end of the output shaft 25 terminates in a bit-receiving socket 41 which receives a suitable screwdriver bit 42, the bit being retained in the socket by means of a ball 43 and a spring-biased sleeve 44. The bit 42 is shown applied to a screw 45 which is being driven into a workpiece 46. In the view of FIG. 3, the tool is in a driving mode and operator bias applied to the back of the tool has overcome the force of the spring 27, moving the shaft 25 relative to the housing so as to bring the clutch teeth 32 and 34 into driving engagement. In this view, it is assumed that the clutch mechanism has been adjusted, in a manner hereinafter described, so that the clutch teeth 32 and 34 are fully engaged and the maximum torque transmitting capability of the clutch is used. When the fastener seats and the desired maximum torque level has been applied to the tool, the clutch teeth slip, thus effectively decoupling the motor from the output shaft.

From the foregoing discussion, it will be understood that the clutch of this invention is somewhat similar to previously known clutches of the positive type. In positive clutches, the jaws are spring biased apart and operator bias force is required to overcome this spring force and hold the teeth in engagement. However, several difficulties are characteristic of the postiive clutch designs previously known. Specifically, once a given tool is selected for use, operator bias pressure is the major determining element of the torque level at which the clutches begin to slip; thus, the torque levels to which successive screws are driven will vary substantially and the tool is very tiring for an operator to use. Furthermore, conventional positive clutches are more difficult to use at high RPM, but require excess time for each individual screw at low RPM.

The other major type of clutch known to the prior art, the adjustable clutch, attempts to resolve these difficulties by providing an internal pair of clutch jaws with an internally adjustable spring which does not depend on operator bias to determine the torque level at which the jaws slip. However, it has been found that tools using this type of clutch mechanism must be tailored to a particular size range of screws since the mechanism which is strong enough to drive large, high torque screws is not sensitive enough to be adjusted to low torque levels while the structure which can be adjusted to low torque levels is not strong enough to drive large screws. Furthermore, an adjustable clutch, because its torque control mechanism is internal, cannot be over-ridden when necessary.

In accord with the present invention, it has been found that all of these difficulties can be overcome and a mechanism is provided which combines the high speed and accurately controllable torque which are characteristic of the adjustable clutch with the wide ranging utility of the positive clutch. In accord with the present invention, this is accomplished by providing an adjustment for the depth of engagement of biased-apart clutch teeth and, preferably, by providing clutch teeth with engagement faces of varying angles.

Considering the illustration of FIG. 2 again, the output shaft 25 which carries the output clutch member 35 is provided with a plurality of balls 50 retained in a carrier 51. These balls are seated in a groove 52 in the output shaft. An adjustable collar 53 is also provided which encloses the balls 50 and which is threadably engaged with the forwardly extending portion 39 of the attaching collar 36. The adjustable collar 53 carries a shoulder 54 which is positioned to serve as a stop to limit the inward movement of the balls 50 and consequentially of the shaft 25. Thus, since the adjusting collar 53 and stop shoulder 54 are adjustably secured to the attachment collar 36 which is axially fixed relative to the clutch member 30 and since the balls 50 are axially fixed relative to the output clutch member 35, adjustment of the collar 53 controls the depth of engagement of the clutch teeth 32 and 34.

FIGS. 2 and 3 illustrate this adjustment in the maximum torque transmission position; that is, the collar 53 has been rotated to move it inwardly so that the shoulder 54 does not obstruct the movement of the shaft 25 and the shaft can be moved until teeth 32 and 34 are fully engaged. In this position, it is preferred that the thrust be taken up by the clutch members 30 and 35; thus, the parts should be sized so that, in the fully inward position of the collar 53 and the shaft 25, the balls 50 do not quite reach the shoulder 54. Of course, as soon as the collar 53 is rotated outwardly from its inward position, the shoulder 54 serves to limit the maximum movement of the shaft 25.

FIG. 4 illustrates one appropriate means for controlling the rotation and consequent axial movement of the collar 53. Specifically, the collar includes a plurality of splines 60 with intermediate grooves 61 on its exterior surface. A spring biased locking collar 62 is provided with cooperating teeth 63 which ride in the tracks 61, thus preventing the collars 53 and 62 from rotating relative to one another. The back surface of the locking collar 62 is provided with a plurality of small cylindrical projections 64 and a forward facing surface 65 of the housing collar 65 is provided with apertures 66 which receive the projections 64. The locking collar 62 is biased toward the surface 65 by an internal spring 67.

To adjust the clutch, the locking collar 63 is pulled forwardly (to the left in the Figures as illustrated in FIG. 4) to release the projections 64 from the apertures 66. The locking collar 63 and adjusting collar 53 can then be rotated together on the threads on member 39. This shifts the adjusting collar 53 axially of the housing and thus adjusts the axial distance of the shoulder 54 from the balls 50. If convenient, the operator may allow the locking collar 63 to "click" against the sides of the apertures 66. By counting the number of clicks, consistent settings at a given torque level can be made. Alternatively, index numbers and a pointer may be provided.

As previously noted, operator bias on the back of the tool against a workpiece urges the shaft 25 to the right in the Figures until the balls 50 encounter the shoulder 54. Thus, axial adjustment of the shoulder 54 by rotation of the collar 53 controls the depth to which the shaft can be moved into the housing. Since the teeth 32 are fixed relative to the housing, this adjustment also controls the depth of engagement of the clutch teeth 32 and 34.

Adjustment of the depth of engagement of the clutch teeth as described above permits a wide variation in the torque level produced by the tool. Preferably the engaging faces of the clutch teeth 32 and 34 are angled slightly in a negative driection from the axis; for example, the driving and driven faces may be tapered at about 15°. When the teeth are fully engaged, as shown in FIG. 3, a very high level of circumferential torque will be applied to the output shaft 25 before the axial component of that force, developed across the 15° angle, is sufficient to lift the tool to the full height of the teeth and separate the teeth to cut off the driving force. On the other hand, if the teeth are engaged at a relatively shallow depth, a much lower level of torque will produce a sufficient axial force to make the teeth ratchet and cut off the driving force applied to the shaft 25. In either case, operator bias can effect the torque level. However, it has been found that the operator easily learns to rely on the depth adjustment to provide torque variation and, in fact, the operator bias required and used is simply the relatively low force required to overcome the spring 27. Thus, the tool is substantially less tiring in continuous use than previous positive clutch tools. On the other hand, if an unusual obstruction such as a knot in wood is encountered, causing the teeth to disengage before the screw is fully driven home, the operator can easily overcome the temporary obstruction by applying extra force for a short period of time. This procedure is substantially faster and more convenient than would be the case if the tool has to be adjusted to a new torque setting each time a temporary obstruction was encountered.

FIG. 5 illustrates one of the clutch members 30 of this invention; the other clutch member 35 is identical in the illustrated construction. The clutch teeth 32 on the face of clutch member 30 can be seen to have tapered surfaces as at 68.

While the above-described adjustable depth feature alone provides a substantial range of torque variation, a further aspect of the preferred embodiment of this invention is the provision of further increases in the taper angle adjacent the tip of the driving face 68 of each tooth 32. For example, FIG. 6 illustrates a particular construction wherein the driving face 68 of tooth 32 includes a first portion 69 extending outwardly from the body of the clutch member 30 which is tapered at an angle of 15° to the axial direction, a second portion 70 tapered at an angle of 45° to the axis and a third portion 71 tapered at an angle of 60° to the axis. Similarly, the tooth 34 on clutch member 35 includes a driving face 72 which has a first portion 73 tapered at an angle of 15°, a second portion 74 tapered at an angle of 45° and a third portion 75 tapered at an angle of 60°.

In the fully engaged position illustrated in FIG. 6, the additional tapered portions 70, 71 and 74, 75 do not affect the performance. The engagement of the primary driving faces 69 and 73 provides the full torque transmitting capability of the tool. In FIG. 7, the teeth are illustrated adjusted to a smaller depth of engagement. Once again, the portions 70, 71 and 74, 75 are not involved in the torque transmission and the surfaces 69 and 73 are only partially engaged. Because the pressure angle of faces 69 and 73 is the same in FIGS. 6 and 7, the axial force required to separate the teeth is the same. However, because of the deeper engagement in FIG. 6, this force must act for a longer time before the teeth separate completely. Therefore, the torque of the motor is applied to the screw for a longer period of time and the screw is driven to a higher torque level. In FIG. 7, the shorter depth of engagement permits the teeth to separate more quickly. Therefore, the driving force is applied for a shorter time and the screw is driven to a significantly lower torque level.

In FIG. 8, the depth of adjustment has been set so that the primary driving faces 69 and 73 can no longer become engaged. In this case, the torque transmitting surfaces are the portions 70 and 74. Similarly, in FIG. 9, the depth of adjustment has been changed to the point where the torque transmitting surfaces are now the outermost tapered surfaces 71 and 75.

The function of these additional tapered surfaces 70, 71 and 74, 75 is to greatly increase the degree of adjustment permitted in the low torque region of the adjustment. Thus, in a particular tool, teeth provided with a single straight surface tapered at 15° was found to provide two clicks of adjustment over a fairly wide range of low torque levels. Provision of the additional tapered surfaces shown in FIGS. 6–9 increased the axial movement required to cover the same range of torque levels to a point where six clicks of adjustment of the locking collar 63 were provided. This permits a substantially finer adjustment of the tool in the low torque regions.

It is also noted that the back face of the teeth 76 should be tapered, preferably at the minimum front face angle (15°) to permit removal of any screws which have been installed by the same tool. The clutch mechanism described in the foregoing specification, in addition to the benefits and advantages referred to therein, overcomes two major objections to the major types of clutches previously available. Specifically, positive clutches depend on operator bias. In addition to the problem of being tiring to use on a continuous basis, these tools have necessarily been relatively low speed since the operator could not accurately control the torque of a high speed positive clutch. Thus, it has been undesirable to use these tools in many production applications since so much time is required to simply run down the fasteners. On the other hand, adjustable clutches have been available operating at significantly higher speeds. However, adjustable clutch tools are not universal and must be designed and manufactured for particular torque ranges.

The clutch mechanism of this invention overcomes both of these objections. Since the torque output of the clutch depends primarily upon the adjusted depth of engagement, the tools can be operated at very high speed without causing torque inconsistencies. On the other hand, since a single mechanism is capable of a very wide range of torque level adjustments, a single tool can be provided for a variety of applications. This is not only more convenient for the user, but it also substantially less expensive since it permits production of larger quantities of a single type tool.

As previously described, the principal feature of this invention is the provision of a mechanism for adjusting the depth of engagement of torque-transmitting clutches. A significant additional feature is the provision of clutch teeth faces tapered at varying angles to increase the sensitivity of adjustment; this could also be accomplished by curving the driving faces. While the mechanism is somewhat similar to a positive clutch in that the clutch teeth are engaged by operator bias, it is essentially different from previous positive clutches since the primary determining factor of the torque as transmitted is the depth of engagement of the teeth as controlled by the adjusting collar. It will accordingly be appreciated that, while a specific embodiment of this invention has been illustrated and described, many changes and modifications thereof may be made while still utilizing the essential teachings of this invention. It is accordingly intended that the appended claims cover all such changes and modifications as fall within the true spirit and scope of this invention.

We claim:

1. A portable power-operated tool of the type including a rotary output tool member and means for preselecting the torque applied through said output member to a workpiece, said tool comprising a housing; motor means within said housing and including rotary output shaft means; output tool means supported by said housing; torque-transmitting clutch means within said housing including a first clutch member associated with said rotary output shaft means and a second clutch member associated with said tool means, said first and said second clutch members being arranged upon engagement thereof to transmit rotational torque from said output shaft means to said tool means; biasing means normally urging said first and said second clutch members to a spaced-apart position; said biasing means being adapted to be overcome upon the application of an axial force between said tool means and said housing; said first and said second clutch members each including axially extending, circumferentially facing surfaces, said surfaces on said first clutch member being arranged to engage said surfaces on said second member when said clutch members are moved into engagement; and adjustable means for limiting the maximum axial depth of engagement of said surfaces.

2. A portable power tool as claimed in claim 1 wherein each of said first and second clutch members comprises axially extending teeth, said circumferentially facing surfaces comprising complementary sides of said teeth.

3. A portable power tool as claimed in claim 1 wherein said surfaces extend outwardly from said first and said second clutch members at an angle to the axis of said clutch means.

4. A portable power tool as claimed in claim 3 wherein at least a major portion of said surfaces is positioned at an angle of 15° to said axis of said clutch means.

5. A portable power tool as claimed in claim 3 wherein each of said surfaces includes a plurality of portions, each of said portions lying at a different angle to said axis than said other portions.

6. A portable power tool as claimed in claim 5 wherein a first of said portions extends at an angle of approximately 15° to said axis, a second portion extends at an angle of approximately 45° to said axis and a third portion extends at an angle of approximately 60° to said axis.

7. A portable power tool as claimed in claim 1 wherein said clutch means comprises the sole torque-transmitting coupling means between said output shaft and said tool means to permit rotation of said output shaft without rotation of said tool means when said first and said second clutch members are disengaged.

8. A portable power operated tool adapted to be held in an operator's hand and to provide an output torque to a workpiece only when said tool is biased against said workpiece by the operator, said tool comprising a housing including a hand grip portion; a motor within said housing having a rotary output shaft; a rotatable chuck means supported by said housing; clutch means for transmitting rotational torque from said output shaft to said chuck means upon engagement thereof, said clutch means including a first clutch member associated with said output shaft and a second clutch member associated with said chuck means; biasing means normally urging said second clutch member out of engagement with said first clutch member; complementary clutch teeth formed on and axially extending from said first and said second clutch members; said chuck means and said second clutch member being slidably mounted within said housing for axial movement toward and away from said first clutch member; and adjusting collar means threadedly engaged with said housing for limiting the axial movement of said chuck means into said housing to control the depth of engagement of said complementary clutch teeth to thereby control the maximum torque transmissible through said clutch means.

9. A portable power tool comprising a housing; motor means within said housing including rotary output shaft means; rotary tool means supported by said housing; torque-transmitting clutch means within said housing for coupling said output shaft means with said tool means, said clutch means comprising complementary sets of clutch teeth respectively associated with said shaft means and said tool means; biasing means normally urging said clutch teeth to a spaced-apart position and adapted to be overcome upon engagement of said power tool with a workpiece, and adjustable means for limiting the maximum depth of engagement of said clutch teeth.

10. A power tool as claimed in claim 9 wherein one of said sets of clutch teeth is axially fixed relative to said housing and wherein said adjustable means comprises a surface axially movable relative to said housing.

11. A power tool claimed in claim 10 wherein the other of said sets of clutch teeth is provided with anti-friction means for engagement with said surface.

12. A portable power tool comprising a housing; motor means within said housing including rotary output shaft means; rotary tool means supported by said housing; torque-transmitting clutch means within said housing for coupling said output shaft means with said tool means, said clutch means comprising complementary sets of clutch teeth respectively associated with said shaft means and said tool means, each of said sets of clutch teeth comprising a plurality of axially extending teeth, each of said teeth having a surface engageable with a corresponding surface on a corresponding tooth in the other of said sets, each of said surfaces including a plurality of regions positioned at different angles to the axis of said sets; biasing means normally urging said clutch teeth to a spaced-apart position and adapted to be overcome upon engagement of said power tool with a workpiece; and adjustable means for limiting the maximum depth of engagement of said clutch teeth.

13. A power tool as claimed in claim 12 wherein a first region at the peak of said teeth is positioned at an angle of 60° relative to said axis; a second region adjacent said first region is positioned at an angle of 45° relative to said axis and a third region adjacent said second region is positioned at an angle of 15° relative to said axis.

14. A portable power tool comprising a housing; motor means within said housing and including rotary output shaft means; rotary tool means supported by said housing; adjustable clutch means within said housing and adapted to couple said output shaft means with said tool means; means for adjusting the maximum torque transmission capability of said clutch; said clutch comprising first means connected to said rotary output shaft and having a first set of clutch teeth extending axially towards said tool means, a second member connected to said tool means and including a second set of clutch teeth extending axially towards said rotary output shaft means; resilient means spacing said first and second sets of clutch teeth apart, said resilient means arranged to be overcome by operator pressure in applying said tool to a workpiece; said adjustable means comprising a stop member threadedly mounted on said housing for limiting the depth of engagement of said first and second sets of clutch teeth.

15. A power tool as claimed in claim 14 wherein each tooth in said first and second sets of clutch teeth comprises a driving face, said driving faces including a first surface region extending respectively from said first and said second members at a shallow angle to the axis of said clutch; and a second surface region extending from said first surface region at a larger angle from the axis of said clutch.

16. A power tool as claimed in claim 15 wherein each of said driving faces further includes a third surface region extending from said second surface region at a larger angle from the axis of said clutch.

17. A power tool as claimed in claim 14 wherein said tool means is slidably supported by said housing and wherein said adjustable means comprises a shoulder axially movably mounted on said housing for limiting the maximum possible movement of said tool means into said housing whereby the maximum torque transmission capacity of said clutch is adjustable.

18. A portable power tool as claimed in claim 14 wherein said output shaft is supported by a bearing fixed in said housing; said first member is axially limited by said bearing; said housing extends forwardly of and encloses first and second members and wherein said adjustable means comprises an external collar movably mounted on said housing.

19. A power tool as claimed in claim 18 wherein said collar includes an internal extending surface positioned to limit the extent of movement of said tool means into said housing.

20. A power tool as claimed in claim 18 wherein said collar is mounted on said housing by means of said screw threads; and wherein a plurality of fixed positions are provided to which said collar can be positively located.

21. A portable power-operated tool of the type including a rotary output tool member and means for selecting the torque applied through said output member to a workpiece, said tool comprising a housing; motor means within said housing including rotary output shaft means; rotary tool means supported by said housing; torque transmitting clutch means within said housing for coupling said output shaft means with said tool means, said clutch means comprising complementary sets of clutch teeth respectively associated with said shaft means and said tool means; biasing means normally urging said clutch teeth to a spaced-apart position and adapted to be overcome upon engagement of said power tool with a workpiece; an adjustable means for limiting the maximum depth of engagement of said clutch teeth, said adjustable means comprising an adjusting collar threadedly mounted on said housing; stop means carried by said collar and cooperable with said tool means for limiting the movement of said tool means into said housing; locking collar means rotationally fixed to and axially slidable on said adjusting collar; said locking collar being juxtaposed with an exposed surface on said housing, said locking collar and said exposed surface including complementary engaging members for preventing rotation of said locking collar relative to said housing; and spring means normally urging said complementary engaging means into engagement.

22. A portable power-operated tool as claimed in claim 21 wherein said locking collar includes axially extending pin means and wherein said surface on said housing includes axially opening aperture means for receiving said pins.

23. A portable power-operated tool as claimed in claim 21 wherein said locking collar comprises a plurality of ribs and wherein said adjusting collar comprises a plurality of grooves receiving said ribs whereby said locking collar and said adjusting collar are prevented from relative rotational movement.

* * * * *